(12) United States Patent
Hall et al.

(10) Patent No.: US 10,214,678 B2
(45) Date of Patent: Feb. 26, 2019

(54) COMPOSITIONS AND METHOD FOR TREATING OUT HYDROGEN SULFIDE AND PREVENTING SETTLING OF PRECIPITATE IN AN ENVIRONMENTALLY RESPONSIBLE DRILLING AND PACKER FLUID

(71) Applicant: Halliburton Energy Services, Inc., Houston, TX (US)

(72) Inventors: John Adrian Hall, Kingwood, TX (US); Kushabhau D. Teke, Maharashtra (IN); Pramod Dadasaheb Nikam, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 86 days.

(21) Appl. No.: 15/429,329

(22) Filed: Feb. 10, 2017

(65) Prior Publication Data

US 2017/0152431 A1   Jun. 1, 2017

Related U.S. Application Data

(62) Division of application No. 13/483,050, filed on May 30, 2012, now Pat. No. 9,605,194.

(51) Int. Cl.

| *C09K 8/532* | (2006.01) |
| *C09K 8/06* | (2006.01) |
| *C09K 8/08* | (2006.01) |
| *C09K 8/34* | (2006.01) |
| *C09K 8/54* | (2006.01) |
| *C09K 8/36* | (2006.01) |

(52) U.S. Cl.
CPC ............... *C09K 8/532* (2013.01); *C09K 8/06* (2013.01); *C09K 8/08* (2013.01); *C09K 8/34* (2013.01); *C09K 8/36* (2013.01); *C09K 8/54* (2013.01); *C09K 2208/20* (2013.01)

(58) Field of Classification Search
CPC . C09K 8/34; C09K 8/36; C09K 8/532; C09K 2208/20; C09K 8/06; C09K 8/08; C09K 8/32; C09K 8/54
See application file for complete search history.

(56) References Cited

U.S. PATENT DOCUMENTS

| 4,036,942 A | 7/1977 | Sibeud et al. |
| 4,252,655 A | 2/1981 | Carney |
| 4,526,693 A | 7/1985 | Son et al. |
| 4,756,836 A | 7/1988 | Jeffrey et al. |
| 5,391,278 A | 2/1995 | Honna et al. |
| 5,472,633 A | 12/1995 | Griffin, Jr. et al. |
| 5,576,271 A | 11/1996 | Patel |
| 5,948,269 A | 9/1999 | Stone |
| 6,365,053 B1 | 4/2002 | Sunde et al. |
| 6,746,611 B2 | 6/2004 | Davidson |
| 7,608,231 B2 | 10/2009 | Bellussi et al. |
| 7,943,105 B2 | 5/2011 | Farha |
| 2004/0167037 A1 | 8/2004 | Davidson |
| 2009/0143252 A1 | 6/2009 | Lehmann et al. |

FOREIGN PATENT DOCUMENTS

EP    0617106 A1   9/1994

OTHER PUBLICATIONS

International Preliminary Report on Patentability issued in related Application No. PCT/US2013/032732, dated Dec. 2, 2014 (7 pages).
International Search Report and Written Opinion issued in related PCT Application No. PCT/US2013/032732, dated Jul. 3, 2013 (10 pages).
SOURSCAV® Scavenger, product data sheet, Aug. 31, 2010, one page, Halliburton.
Walker, Michael L. et al. "Iron control provides sustained production increase in wells containing sour gas", journal supplement, Nov. 1990, JCPT90-06-039, The Journal of Canadian Petroleum Technology (5 pages).
Davidson, Eric, et al. "An Environmentally Friendly, Highly Effective Hydrogen Sulphide Scavenger for Drilling Fluids", presentation, Oct. 2003, SPE 84313, Society of Petroleum Engineers, Denver, Colorado, US (8 pages).
Brezinski, Michael M., "Chelating Agents in Sour Well Acidizing: Methodology or Mythology", presentation, 1999, five pages, SPE 54721, Society of Petroleum Engineers, The Hague, The Netherlands.

*Primary Examiner* — Frances Tischler
(74) *Attorney, Agent, or Firm* — Tenley Krueger; Baker Botts L.L.P.

(57) ABSTRACT

An environmentally responsible iron chelating additive and method for removing hydrogen sulfide or sulfide ions from drilling and packer fluids and preventing settling of precipitates. Iron chelating agents selected from the group consisting of ferrous lactate, ferrous gluconate, ferrous bis glycinate, ferrous citrate, ferrous acetate, ferrous fumarate, ferrous succinate, ferrous sacchrate, ferrous tartarate, ferrous glycine sulfate, ferrous glutamate, ferrous ascorbate, ferrous polymaltose, or a combination thereof, may be used. When the fluids are oil based, the iron chelating agents are added to the water phase of an emulsion, and the emulsion is added to the fluid. Viscosifiers may also be added to the drilling fluid with the emulsion.

10 Claims, No Drawings

COMPOSITIONS AND METHOD FOR TREATING OUT HYDROGEN SULFIDE AND PREVENTING SETTLING OF PRECIPITATE IN AN ENVIRONMENTALLY RESPONSIBLE DRILLING AND PACKER FLUID

CROSS-REFERENCE TO RELATED APPLICATIONS

This is a divisional of U.S. application Ser. No. 13/482,050 filed on May 30, 2012, entitled "COMPOSITIONS AND METHOD FOR TREATING OUT HYDROGEN SULFIDE AND PREVENTING SETTLING OF PRECIPITATE IN AN ENVIRONMENTALLY RESPONSIBLE DRILLING AND PACKER FLUID," the entire disclosure of which is hereby incorporated by reference.

BACKGROUND OF THE DISCLOSURE

1. Field of the Disclosure

This disclosure relates to methods and compositions for removal or inactivation of hydrogen sulfide or soluble sulfide ions from drilling fluids used in drilling and completing wells in subterranean formations, and most particularly packer fluids. The advantages of the disclosure are particularly appreciated in high temperature, high pressure wells where the drilling fluids are oil based.

2. Description of Relevant Art

Drilling a well in a hydrocarbon bearing subterranean formation for the production of hydrocarbons from said formation typically involves use of a drilling apparatus and drilling fluid. The drilling apparatus usually comprises a bit mounted on a string of hollow steel pipe. This hollow pipe is often used to rotate the bit to enable the bit to cut into the formation. The hollow pipe also acts as a conduit for the drilling fluid to be pumped down to the bottom of the hole, from where it rises to the surface via the annulus between the drill string and the borehole wall. The drilling fluid has many functions, one of the most important of which is to convey the cuttings from the bit downhole up to the surface of the well.

Good shear thinning rheology is an important property for drilling fluids. Historically, this property was generally achieved in one of two ways with aqueous based fluids: by using a dispersion of colloidal clay minerals such as smectite clays, e.g., bentonite; or by using polymers such as xanthan gum or scleroglucan dispersed in aqueous solutions to give shear thinning fluids. Each approach has known advantages and disadvantages, although use of polymers has increasingly become preferred over clays. Systems based on dispersed colloids are susceptible to the effects of dispersing and flocculating agents, whereas the rheology of polymer based fluids is more easily controlled. A disadvantage of many polymers, however, is that, since they are polyols, they are susceptible to crosslinking at high pH by the presence of even a low concentration of multivalent cation, such as iron (III) ions.

Specialized drilling fluids called packer fluids used in drilling are typically left in the annular region of a well between the tubing and outer casing above a packer. The main functions of a packer fluid are: (1) to provide hydrostatic pressure so as to lower the differential pressure across the sealing element; (2) to lower differential pressure on the wellbore and casing to prevent collapse; and (3) to protect metals and elastomers from corrosion. In well completions, packer fluids remain in the well tubing-casing annulus above the packer after the well completion has been run and all circulation devices have been isolated. While packer fluids are prepared for the requirements of the given completion, they generally should be of sufficient density to control the producing-formation, be solids-free and resistant to viscosity changes over long periods of time, and be noncorrosive to the wellbore and completion components.

In drilling some subterranean formations, and often particularly those bearing oil or gas, hydrogen sulfide accumulations are frequently encountered. The drilling fluid brings the hydrogen sulfide to the surface. Such sulfide in the drilling fluid is problematic, as it can corrode the steel in the drilling apparatus and may be liberated into the atmosphere as toxic sulfide gas at the well surface.

Generally, to protect the health of those working with the drilling fluid and those at the surface of the well, conditions should be maintained to ensure that the concentration of hydrogen sulfide above the fluid, emitted due to the partial pressure of the gas, is less than about 15 ppm. The partial pressure of hydrogen sulfide at ambient temperature is a function of the concentration of sulfide ions in the fluid and the pH of the fluid. To ensure that the limit of 15 ppm is not exceeded even for the maximum sulfide concentration that may be encountered in a subterranean formation, the pH of the drilling fluid is typically maintained at a minimum of about 11.5. Also, to prevent the soluble sulfide concentration in the fluid from becoming excessive, action is routinely taken to remove sulfide from the fluid.

A common process for removing sulfide from drilling fluids is by precipitation, usually with a solid zinc compound. Zinc compounds commonly used are zinc oxide and zinc carbonate. These compounds react with hydrogen sulfide to form insoluble zinc sulfide. In insoluble form, the sulfide is relatively harmless (unless the pH falls to acid conditions) and can be removed from the fluid by known separation techniques.

Because these zinc compounds are solids, the reaction rate can be slow, which is especially undesirable when high concentrations of sulfide are encountered or when removal of final traces of sulfide is desired. However, soluble zinc salts can not be used as they hydrolyze at low pH, forming gelatinous hydroxide. While the gelatinous hydroxide would still react with the sulfide, the gelatinous solid would likely interfere with the rheological properties of the drilling fluid. Also, zinc salts behave as acids and tend to reduce the pH of the fluid, increasing the risk of greater emission of hydrogen sulfide into the air.

U.S. Pat. No. 4,252,655 to Carney discloses a soluble form of zinc in a chelated form for use as a hydrogen sulfide scavenger in an oil well. The chelating agents disclosed in U.S. Pat. No. 4,252,655 are low molecular weight hydrocarbon based materials containing acetic or nitrogen functional groups with a stability constant in the range of about 10-16, as described by Chaber Martell in Organic Sequestering Agents. Zinc chelates with a stabilizing constant outside of this range of about 10-16 are said to be either ineffective for removing soluble sulfide ion or to adversely affect the rheology of the well fluid.

Various zinc compounds—both soluble and insoluble— have been used as sulfide scavengers for many years and historically were generally regarded as an industry standard. However, all zinc compounds have the disadvantage that zinc is regarded as a toxic heavy metal whose discharge must be carefully controlled to protect the environment. When a zinc scavenger is used in the drilling fluid, the cuttings, as well as the residual fluid at the end of the drilling operation, will be contaminated with zinc. Environmental awareness has increasingly made use of zinc unacceptable.

Most other heavy metals which react with hydrogen sulfide to form insoluble sulfide such as copper (both oxidation states), mercury, lead, and nickel, also cause environmental concerns and thus are no more acceptable than zinc.

An exception is iron, a metal, that also forms insoluble sulfide upon reaction with hydrogen sulfide but which is largely free from environmental concerns. Iron salts, however, have been found to be unsuitable as sulfide scavengers because the compounds are not stable in solutions at high pH. At the pH used in drilling fluids, both iron (II) and iron (III) are precipitated as gelatinous iron hydroxide, which would have unacceptable effects on the rheology of the drilling fluid.

U.S. Pat. No. 4,756,836 to Jeffrey et al. teaches using an iron chelate as a downhole hydrogen sulfide scavenger in drilling mud, particularly water based clay muds. This patent discloses chelates of iron with hydroxethylethylenediaminetriacetic acid (HEDTA), nitrilotriacetic acid (NTA), ethylenediaminetetraacetic acid (EDTA), and diethylenetriaminepentaacetic acid (DTPA). The chelates are said to convert hydrogen sulfide to sulphur. Claimed advantages of this disclosure are said to be that the iron chelate is regenerated by oxygen at the surface and that the iron scavenges oxygen in the mud stream to cut down oxygen assisted corrosion of the drill stem. This patent further teaches that whether the iron is supplied in the Fe (II) or Fe(III) form, exposure to oxygen at some point in the mud flow changes the form to Fe (III) to prepare the chelate for hydrogen sulfide conversion. Oxygen exposure in an aerated mud pit or in the shale shaker or by another oxygen source is said to aid regeneration of the iron chelate.

While iron (III) is known to readily chelate with EDTA, NTA and HEDTA and DTPA, such complexes have limited stability at high pH. Iron in these complexes is well known to tend to precipitate out as ferric hydroxide at a pH greater than 9. For example, manufacturers of these chelates typically quote stability or effectiveness as an Fe(III) chelate, of NTA at pH 1-3, DPTA at pH 1-7, EDTA at pH 1-6, and HEDTA at pH 1-9. At pH higher than such ranges, these chelating agents lack ability to stabilize the iron against precipitation as the hydroxide. For effective use as a scavenger according to the teachings of Jeffrey's U.S. Pat. No. 4,756,836, the iron must stay in chelated form. Further, the multivalent nature of iron III is likely to cause crosslinking of polymers in a polymer based drilling mud, leading to gelation and interference with the rheology of the fluid.

U.S. Pat. No. 6,746,611 to Davidson provides an environmentally friendly method of removing hydrogen sulfide or sulfide ions from fluids having a pH in excess of about 9 where ferrous gluconates, as iron chelating agents, are added to the fluid in quantities sufficient to form iron sulfide with the sulfide ion. This patent also teaches an additive for drilling fluids comprising iron chelating agents, particularly ferrous gluconate, in an effective amount for removing hydrogen sulfide from the fluid. The additive has stability at a pH in excess of about 9 and as high as about 11 to 12 or higher.

Iron gluconate is now recognized as a desirable non-toxic hydrogen sulfide scavenger, effective in aqueous drilling fluids, and it has also been successfully used in some oil based drilling fluids, including invert emulsion based drilling fluids. Oil based drilling fluids, typically comprising mineral oils or synthetic oils, are most commonly used in high temperature, high pressure wells because the temperatures are too high for aqueous based fluids. Those wells also commonly have hydrogen sulfide present. A continuing need exists for environmentally friendly hydrogen sulfide scavengers suitable and effective for use in drilling fluids.

SUMMARY OF THE DISCLOSURE

The present disclosure provides an additive and an environmentally friendly method for removing hydrogen sulfide or sulfide ions from fluids. The additive and method are particularly advantageous in oil or oleaginous based fluids, and have utility as well in aqueous or water based fluids. In the method, iron chelating agents particularly selected from the group consisting of ferrous lactate, ferrous bis glycinate, ferrous citrate, ferrous acetate, ferrous fumarate, ferrous succinate, ferrous sacchrate, ferrous tartarate, ferrous glycine sulfate, ferrous glutamate, ferrous ascorbate, ferrous polymaltose, or a combination thereof, are added to an aqueous drilling fluid, or in the case of an invert emulsion based drilling fluid, to the water in the emulsion (or to the water phase of the invert (water in oil) emulsion), and the emulsion comprising the iron chelating agents is added to the drilling fluid, in quantities sufficient to form iron sulfide with the sulfide ion. Stronger chelation of iron may be realized by adding an excess of the chelating group than the stoichiometric equation would suggest would be required for the chelation. A viscosifier such as sepiolite for nonliquiring example is also added to the drilling fluid with the emulsion. The emulsion comprising the iron chelating agent is mixed with the drilling fluid and an iron sulfide precipitate is formed when the drilling fluid comes in contact with hydrogen sulfide from the formation. The hydrogen sulfide or sulfide ion concentration in the fluid may be maintained at or below a desired level by maintaining the iron chelating agent content of the fluid at a certain effective level.

This method is particularly suited for removing hydrogen sulfide from a drilling fluid used in drilling a well or borehole, and may also be used for removing hydrogen sulfide from a packer fluid for packing a well, in a hydrocarbon bearing formation where hydrogen sulfide is frequently encountered.

The present disclosure further comprises an additive for aqueous drilling fluids and packer fluids and for oil based drilling fluids and packer fluids comprising iron chelating agents dissolved in the water phase of an emulsion wherein the iron chelating agents are particularly selected from the group consisting of ferrous lactate, ferrous bis glycinate, ferrous citrate, ferrous acetate, ferrous fumarate, ferrous succinate, ferrous sacchrate, ferrous tartarate, ferrous glycine sulfate, ferrous glutamate, ferrous ascorbate, ferrous polymaltose, or a combination thereof. Ferrous gluconate may also be used for packer fluids. These iron chelating agents may also be substituted for any known hydrogen sulfide scavengers in drilling fluids or packer fluids, and may be added to the fluids directly when the fluids are aqueous based. The additive comprises the iron chelating agent in an effective amount for removing hydrogen sulfide from the drilling or packer fluid.

DESCRIPTION OF THE PREFERRED EMBODIMENT

In the past, the limited stability of known iron chelating agents such as nitrilotriacetic acid (NTA), ethylenediaminetetraacetic acid (EDTA), hydroxyethylenediaminetriacetic acid (HEDTA) and diethylenetriaminepentaacetic acid (DTPA), limited their utility as sulfide scavengers for high pH drilling fluids typically used in drilling wells in subterranean formations. The sulfide scavenger mechanism suggested by U.S. Pat. No. 4,252,655 to Carney—that the metal complex needs to be strong enough to confer stability in a solution of high pH, i.e., so that the metal is not precipitated as the hydroxide, but conversely the solubility of the sulfide needs to be sufficiently low so as to allow the metal to be removed from the chelated form and precipitated as the sulfide—further cast doubt on the utility of iron compounds as a sulfide scavenger in drilling fluids. That is, the solubility product of iron II hydroxide is $8.0 \times 10^{16}$, whereas the solubility product of iron sulfide is $8.0 \times 10^{18}$, values differing by only a relatively small factor of 100. Generally, the solubility products of metal salts such as sulfides and hydroxides are a guide to the solubility of the salts. Hence, the small difference in solubility product between iron sulfide and iron hydroxide had indicated that iron chelating agents may have very limited utility as sulfide scavengers.

Efforts to locate an iron chelating agent for use as a sulfide scavenger at high pH applying the teaching of U.S. Pat. No. 4,756,836 to Jeffrey et al. resulted in tests of ethylenediaminebis(2-hydroxyphenylacetic acid)(EDDHA) and similar multidentate ligands. The tests indicated that EDDHA and EDDHA type compounds show stability as iron chelating agents at pH 11, but tend to form gels in drilling fluids. Such gels are believed to result from crosslinking of the polymers in the fluids caused by the trivalent iron ions in these compounds. Gels in drilling fluids are likely to cause rheological problems, making the fluid difficult to pump, and efforts to pump the fluid could lead to fracturing the well.

Specifically, test of Fe(III) EDDHA complex in a polymer-based fluid showed the following observations: at pH 11.5, a brown ferric hydroxide precipitate and hence lack of stability as a chelating agent; at pH 11.0, no precipitate, but stringy mud becoming gelatinous on standing; and at pH 10.5, again stringy mud that gelled on standing. The formulation of this drilling fluid was: 0.75 oil free barrel (bbl) saturated sodium chloride solution; 1.0 pound (avoirdupois) per barrel (ppb) carboxymethyl cellulose; 1.5 ppb starch; 1.0 ppb xanthan gum; 3.0 ppb sodium polyacrylate; and 1.5 ppb potassium hydroxide.

Phosphonates had also been considered as potential ligands for the formulation of iron based sulfide scavenger, but those have some potential disadvantages. Phosphonates are generally slightly toxic, poorly biodegradable and tend to be effective dispersants—all three are unattractive features for a compound to be used in a drilling fluid.

Nevertheless, because of the bio-friendly nature of iron, efforts continued to find us pH most commonly desired for drilling fluids that are in contaeful iron chelating agent for sulfide scavenging in drilling fluids.

Then Davidson in U.S. Pat. No. 6,746,611 provided methods for scavenging sulfide in high pH fluids that are particularly suitable for drilling fluids used in drilling wells in hydrocarbon-bearing subterranean formations. The methods employ an additive comprising an organic compound from a group capable of acting as a chelating agent with iron. The iron chelate compounds or complexes are stable at high pH and do not form gels in polymer based fluids, making the complexes or compounds excellent sulfide scavengers for use in drilling fluids. Particularly, gluconic acid has been found to form stable complexes with iron (II) at pH above 9 and even at pH ranging from about 11 to 12 or higher, thect with soluble sulfide or hydrogen sulfide.

Iron(II) or ferrous gluconate is commonly used as an iron supplement for dietary purposes and thus is considered non-toxic. Further, the gluconic moiety is derived from glucose and thus iron (II) gluconate is also fully biodegradable. Davidson also disclosed that heptagluconate could be substituted for gluconate in the compounds or complexes of the Davidson disclosure.

Iron (II) gluconate as a sulfide scavenger has an advantage of being a readily available and environmentally friendly or environmentally acceptable compound or complex. Moreover, iron(II) gluconate is effective as a sulfide scavenger. It also does not impair the properties of the drilling fluid to which it is added.

The present disclosure provides a method for using iron compounds effectively in aqueous drilling fluids and oil based drilling fluids, and is also desirable for aqueous and oil based packer fluids. Accordingly, in the present disclosure, the iron compound, or an additive comprising the iron compound, is dissolved in the aqueous fluid or in the water phase of a water in oil emulsion and the emulsion is added to the oil based drilling fluid. The oil comprising the emulsion may be the same or different from the oil comprising the drilling fluid, but should be compatible with the oil comprising the drilling fluid if different from that oil. A viscosifier or viscosifying agent, such as for nonlimiting example sepiolite, is preferably added to the drilling fluid to increase the stability of the system.

In the method of the disclosure, hydrogen sulfide will migrate into the drilling fluid comprising this iron compound and will react with the iron compound, precipitating out as iron sulfide. The viscosifier in the system is believed to prevent settling of the precipitate. When the drilling fluid is a packer fluid, the viscosifier reduces the risk of having to remove iron sulfide precipitate from the base of the annulus when the well is worked over or abandoned.

The emulsion comprising the iron compound may typically be added to the drilling fluid in the mud pit, before the fluid has circulated or before the fluid contains any detectable amount of sulphur or hydrogen sulfide, as a prophylactic measure against any hydrogen sulfide the fluid may encounter downhole. However, alternatively or additionally, the iron compound (or additive comprising the iron compound) may be added after the fluid has been circulating downhole and has already encountered sulphur or hydrogen sulfide and contains same. When the drilling fluid is a packer fluid, the iron compound or the emulsion comprising the iron compound is preferably added before the packer fluid is used.

The iron compound may be added into the aqueous drilling fluid or into the emulsion to be added into the oil based drilling fluid in solid or liquid form. If in liquid form, the preferred carrier fluid is water. Any other components of the additive should not be of the type that can interfere with the chelating action of the complexing agent with the iron or with the stability of the complex. Further, any such other components should preferably not be of a type to cause crosslinking of polymers, particularly if the drilling fluid comprises polymers. The quantity of iron compound to be added will generally depend on the quantity of hydrogen sulfide desired to be removed or scavenged. Generally, one mole of ferrous gluconate, for example, will remove one mole of hydrogen sulfide. Stronger chelation of the iron may result when an excess of the complexing agent, such as gluconate for example, is present in the fluid for the amount of hydrogen sulfide in the fluid.

In addition to ferrous gluconate given in the example above, we have discovered that other ferrous based chelating compounds may be used in the disclosure, for addition to the drilling fluid or packer fluid (directly for aqueous fluids or in an oil in water emulsion for oil based fluids). These other ferrous based chelating compounds that may be used instead of ferrous gluconate include: ferrous lactate, ferrous bis glycinate, ferrous citrate, ferrous acetate, ferrous fumarate, ferrous succinate, ferrous sacchrate, ferrous tartarate, ferrous glycine sulfate, ferrous glutamate, ferrous ascorbate, and ferrous polymaltose, or combinations thereof. As previously indicated, these compounds may be added to aqueous based drilling fluid without need for dissolution in an emulsion, and for oil based fluids these compounds are first dissolved in an oil in water emulsion which is added to the oil based fluids. These compounds may be effectively substituted for any other hydrogen scavenger currently in use, in oil based or aqueous based drilling fluids or packer fluids.

The above named ferrous based compounds have similar chemistries to ferrous gluconate in terms of solubility, chemical and thermal stability, and capability to react with hydrogen in drilling fluids and packer fluids. They are also biodegradable and environmentally acceptable. However, the ferrous content in these other ferrous based compounds is more than 14%, higher than that of ferrous gluconate which has a ferrous content of 12%. Specifically, these other compounds have the ferrous content indicated in Table 1 below:

TABLE 1

| Name of Scavenger | Iron Content (%) |
|---|---|
| Ferrous Lactate | 19 |
| Ferrous bis glycinate | 20 |
| Ferrous succinate | 35 |
| Ferrous fumarate | 33 |
| Ferrous glycine sulphate | 23 |
| Ferrous ascorbate | 14 |
| Ferrous citrate | 22 |
| Ferrous acetate | 32 |
| Ferrous Tartarate | 27 |
| Ferrous sacchrate | 15 |
| Ferrous glutamate | 28 |

The higher iron content of these compounds advantageously allows reduced amounts of the compounds to be used in the drilling fluids and packer fluids compared to ferrous gluconate, as indicated in the tests reported in Table 2 below. Such reduction saves costs and minimizes any effect the compounds might have on the rheology of the fluids. Also, by needing reduced amounts of the compounds, storage space for the compounds is reduced as are the handing costs.

Tests were conducted with saturated sodium chloride brine to show the effectiveness of these iron compounds as hydrogen sulfide scavengers in drilling fluids and packer fluids. The test procedure was as follows:

1. A Control Sample (No. 1 in Table 2) was prepared by introducing into one barrel of saturated brine solution 0.25 lb of sodium sulfide monohydrate and adjusting the pH of the solution to 11.1, and stirring it in a mixer cup for 15 minutes on a multimixer. The solution was filtered through a 0.45 micron syringe filter. Filtrate was tested for hydrogen sulfide content using a Garret Gas train apparatus (GGT).

2. The iron compounds of the disclosure were then tested as hydrogen sulfide scavengers for comparison to the Control Sample. The pH of the brine with added sodium sulfide was maintained at 11.1. The iron compounds to be tested were added into separate portions of the brine in the mixer and stirred for 15 minutes. The samples were then filtered through a 0.45 micron syringe filter and tested for hydrogen sulfide content using a Garret Gas train apparatus. In some cases the reaction was observed to be slow and in such cases, the sample was hot rolled for four hours at 150° F., cooled, and the filtrate tested using a Garret Gas train apparatus for presence of sulfide.

The results are shown in Table 2.

TABLE 2

|  | 1 | 2 | 3 | 4 | 5 | 6 | 7 |
|---|---|---|---|---|---|---|---|
| Brine taken, bbl | 1 | 1 | 1 | 1 | 1 | 1 | 1 |
| $Na_2S \cdot H_2O$ added, ppb | 0.25 | 0.25 | 0.25 | 0.25 | 0.25 | 0.25 | 0.25 |
| Stirring time, min | 5 | 5 | 5 | 5 | 5 | 5 | 5 |
| pH | 11.1 | 11.1 | 11.1 | 11.1 | 11.1 | 11.1 | 11.1 |
| Scavenger-Ferrous compound | — | Gluconate | Lactate | Fumarate | Tartarate | Succinate | Ascorbate |
| Iron content of scavenger % | — | 12.2 | 20.6 | 31 | 22.7 | 34.6 | 14 |
| Scavenger, ppb | — | 1.100 | 0.700 | 0.500 | 0.700 | 0.400 | 1.100 |
| Stirring time, min | — | 15 | 15 | 15 | 15 | 15 | 15 |
| pH after stirring | 11 | 6.7 | 6.4 | 9.8 | 8.9 | 9.9 | 6.2 |
| $H_2S$ by GGT, ppm | 144 | 0 | 0 | 72 | 0 | 36 | 0 |
| Hot roll temp., ° F. | — | — | — | 222 | — | 222 | 222 |
| Hot roll time, hr | — | — | — | 4 | — | 4 | 4 |
| pH after hot roll | — | — | — | 4.8 | — | 6 | 5.3 |
| $H_2S$ by GGT, ppm | — | — | — | 0 | — | 0 | — |

TABLE 2-continued

| | 1 | 2 | 3 | 4 | 5 | 6 | 7 |
|---|---|---|---|---|---|---|---|
| Quantity used compared to Fe(II) gluconate | Blank | 1.0 | 0.64 | 0.454 | 0.64 | 0.364 | 1.00 |

Tests were also conducted to consider the effect of an example iron compound of the disclosure on an aqueous drilling fluid. The results are shown in Table 3. The first formulation, called Example 1, was a base formulation, with no iron compound added. Example 2 had 1.4 ppb iron compound added to the drilling fluid to react with any hydrogen sulfide that might enter from the subterranean formation. No hydrogen sulfide was actually in either Example 1 or Example 2. Example 3 contained 0.5 ppb of sodium sulfide with 1.4 ppb iron compound added thereto, simulating actual conditions in the subterranean formation. The tests indicated that the iron compounds of the disclosure did not adversely impact or affect the rheological properties of the drilling fluid. Further details of the tests and the results showing mud properties of the drilling fluid, are shown in Table 3.

TABLE 3

| FORMULATIONS | Example 1 | Example 2 | Example 3 |
|---|---|---|---|
| Water, lb | 297.3 | 297.3 | 297.3 |
| NaCl, lb | 95.15 | 95.15 | 95.15 |
| Xanthan, lb | 1 | 1 | 1 |
| Carboxy methyl cellulose, lb | 1 | 1 | 1 |
| Starch, lb | 2 | 2 | 2 |
| Barite, lb | 65.8 | 65.8 | 65.8 |
| Magnesium oxide, lb | 1 | 1 | 1 |
| KOH, lb | 0.25 | 1.25 | 1.25 |
| Ferrous Lactate, lb | — | 1.4 | 1.4 |
| Na2S•H2O, lb | — | — | 0.5 |
| Defoamer, lb | — | 0.05 | 0.05 |
| Mud weight, ppg | 11 | 11 | 11 |
| pH before hot roll | 10.5 | 11.0 | 11.4 |
| Hot rolled for hours | 16 | 16 | 16 |
| Hot roll temp. in ° F. | 150 | 150 | 150 |
| pH after hot roll | 10.3 | 11.0 | 11.5 |
| FANN 35 Rheology @120° F. and LPLT filtrate data | | | |
| 600 rpm | 61 | 50 | 52 |
| 300 rpm | 44 | 35 | 37 |
| 200 rpm | 37 | 26 | 28 |
| 100 rpm | 28 | 18 | 19 |
| 6 rpm | 8 | 6 | 6 |
| 3 rpm | 7 | 5 | 5 |
| PLASTIC VISCOSITY, cp | 17 | 15 | 15 |
| YIELD POINT lb/100 ft² | 27 | 20 | 22 |
| GELS 10 sec | 7 | 5 | 7 |
| GELS 10 min. | 8 | 7 | 10 |
| API Fluid Loss, ml | 3.2 | 2.8 | 5.8 |
| HPHT, @250 F. filtrate, ml | 16.0 | 14.0 | 12.0 |

A similar test was conducted with one of the iron compounds of the disclosure in an oil based packer fluid. The results of this test are shown in Table 4. The tests indicated that the packer fluid with an iron compound of the disclosure did not result in sagging or settlement of precipitate of ferrous sulfide when the viscosifier was used.

TABLE 4

| Additive | Time, min. | 15.0 lb/gal (1.8 sg) | 15.0 lb/gal (1.8 sg) |
|---|---|---|---|
| Diesel, bbl | | 0.647 | 0.603 |
| EZ MUL NT ® emulsifier, lb | 5 | 12.5 | 12.5 |
| Na2S•H2O, lb | 5 | 0.5 | 0.5 |
| Water, bbl | | 0.0375 | 0.035 |
| GELTONE ® II viscosifier, lb | 10 | 0 | 18 |
| NaCl, lb | 5 | 1.6 | 1.56 |
| Ferrous Lactate, lb | 5 | 1.4 | 1.4 |
| BAROID ® weighting material, lb | 5 | 412.9 | 390.2 |
| Refrigerated to 4° C., min | 120 | | |
| GELTONE II, lb | 5 | 0 | 18 |
| Mixing time, min. | 5 | | |
| Static aged at temp. ° F. | 2880(48 hours) | 78 | 78 |
| Remarks | | In absence of viscosifier: Iron sulfide separated at oil junction and settled BARITE | With the viscosifier present, neither the iron sulfide nor the BARITE settled or sagged. |

All trademarked products in the tables herein are available from Halliburton Energy Services, Inc., in Houston, Tex. and Duncan, Okla.

The foregoing description of the disclosure is intended to be a description of preferred embodiments. Various changes in the details of the described method and compositions can be made without departing from the intended scope of this disclosure as defined by the appended claims.

What is claimed is:

1. A fluid for use in the presence of hydrogen sulfide in a subterranean formation, comprising:
   an oleaginous base;
   an additive comprising at least one ferrous based compound selected from the group of consisting of ferrous lactate, ferrous bis glycinate, ferrous citrate, ferrous acetate, ferrous fumarate, ferrous succinate, ferrous sacchrate, ferrous tartarate, ferrous glycine sulfate, ferrous glutamate, ferrous ascorbate, ferrous polymaltose, and combinations thereof; and
   a viscosifier, such that the product of any reaction of the ferrous based compound with any hydrogen sulfide in the fluid will remain in suspension in the fluid.

2. The fluid of claim 1 wherein the additive is prepared by first dissolving the ferrous based compound in an aqueous portion of a water-in-oil emulsion before the additive is added to the fluid.

3. The fluid of claim 2 wherein the ferrous based compound is added directly into the oleaginous base.

4. The fluid of claim 2 wherein the oil in the water-in-oil emulsion and the oleaginous base are the same or are compatible.

5. The fluid of claim 1 wherein the ferrous based compound does not adversely affect the rheological properties of the fluid.

6. The fluid of claim 1 wherein the ferrous based compound has an iron content of at least 14%.

7. The fluid of claim 1 wherein the fluid has a pH above about 9.

8. The fluid of claim 1 wherein the fluid has a pH above about 11.

9. The fluid of claim 1 wherein the fluid is a packer fluid.

10. The fluid of claim 1 wherein the fluid is a drilling fluid.

\* \* \* \* \*